United States Patent
Slack et al.

(10) Patent No.: US 8,069,630 B2
(45) Date of Patent: *Dec. 6, 2011

(54) SYSTEM AND METHOD FOR INTERLOCKING SUPPORT BLOCKS

(75) Inventors: David C. Slack, Tampa, FL (US); Navin Kadakia, Bridgeville, PA (US)

(73) Assignee: Severn Trent Water Purification, Inc., Colmar, PA (US)

( * ) Notice: Subject to any disclaimer, the term of this patent is extended or adjusted under 35 U.S.C. 154(b) by 1189 days.

This patent is subject to a terminal disclaimer.

(21) Appl. No.: 11/728,868

(22) Filed: Mar. 27, 2007

(65) Prior Publication Data

US 2007/0190865 A1   Aug. 16, 2007

Related U.S. Application Data

(63) Continuation-in-part of application No. PCT/US2006/005456, filed on Feb. 15, 2006.

(51) Int. Cl.
*E04C 3/00*   (2006.01)
*E04C 2/04*   (2006.01)
*E04B 2/00*   (2006.01)
*B01D 24/00*  (2006.01)
*B01D 24/12*  (2006.01)

(52) U.S. Cl. ....... 52/589.1; 52/578; 52/590.1; 52/590.2; 52/591.1; 52/592.1; 52/588.1; 52/604; 210/289; 210/293

(58) Field of Classification Search ............ 52/578, 52/589.1, 590.1, 590.2, 591.1, 591.2, 591.3, 52/591.4, 591.5, 592.1–592.4, 596, 588.1, 52/597, 604; 210/275, 293, 289

See application file for complete search history.

(56) References Cited

U.S. PATENT DOCUMENTS

| | | | | |
|---|---|---|---|---|
| 3,148,477 A | * | 9/1964 | Bjorn et al. | 52/591.2 |
| 4,287,693 A | | 9/1981 | Collette | |
| 4,376,593 A | * | 3/1983 | Schaefer | 403/231 |
| 4,923,606 A | * | 5/1990 | Gresh et al. | 210/275 |

(Continued)

FOREIGN PATENT DOCUMENTS

GB   0814131.9   6/2010

OTHER PUBLICATIONS

SIPO Office Action dated May 5, 2011 for Chinese Counterpart Application No. 200680052832.1 filed Aug. 14, 2008.

(Continued)

*Primary Examiner* — Phi A
*Assistant Examiner* — Omar Hijaz
(74) *Attorney, Agent, or Firm* — D'Ambrosio & Menon, LLP; Usha Menon; Srikant Viswanadham (57) ABSTRACT

A system and method for forming a filter media support system with multiple locking mechanisms. The support system comprises two or more interlocking rows of support blocks. One or more slides and one or more guides protrude from the side walls of the blocks. Each guide is conformed to receive one slide from a neighboring block, forming a first locking joint. The side walls also comprise one or more nubs and one or more recesses. Each nub is conformed to fit within one recess of a neighboring block, forming a second locking joint. In one embodiment, the method for assembling the support system comprises aligning a slide of a first support block with a guide of a second support block. The slide of the first support block is vertically moved into the guide of the second support block. Force is applied so that the nubs are flexed within the recesses.

35 Claims, 6 Drawing Sheets

U.S. PATENT DOCUMENTS

| | | | |
|---|---|---|---|
| 5,076,534 A | 12/1991 | Adam | |
| 5,890,836 A | 4/1999 | Leech | |
| 6,050,044 A * | 4/2000 | McIntosh | 52/591.1 |
| 6,071,041 A | 6/2000 | Knight | |
| 6,079,902 A | 6/2000 | Pettee, Jr. | |
| 6,244,009 B1 * | 6/2001 | Cerrato | 52/604 |
| 6,255,102 B1 | 7/2001 | Hallsten | |
| 6,526,705 B1 * | 3/2003 | MacDonald | 52/177 |
| D483,499 S * | 12/2003 | Payne | D25/113 |
| 2003/0080040 A1 | 5/2003 | Savage et al. | |
| 2005/0028475 A1 * | 2/2005 | Barlow et al. | 52/578 |
| 2005/0218061 A1 | 10/2005 | Slack et al. | |
| 2006/0053725 A1 * | 3/2006 | Su | 52/590.1 |
| 2006/0283125 A1 * | 12/2006 | Moller | 52/578 |

OTHER PUBLICATIONS

Co-pending U.S. Appl. No. 12/279,364, filed Aug. 14, 2008.
USPTO Office Action dated Mar. 11, 2011 for co-pending U.S. Appl. No. 12/279,364.
SIPO Office Action dated Jan. 4, 2009 for Chinese Counterpart Application No. 200680052832.1 filed Aug. 14, 2008.

* cited by examiner

SYSTEM AND METHOD FOR INTERLOCKING SUPPORT BLOCKS

This application is a continuation-in-part of International Application No. PCT/US2006/005456 with a filing date of Feb. 15, 2006.

FIELD OF THE INVENTION

The present invention relates to a support system for a filter media system. More particularly, the present invention relates to a system and method for interlocking filter media support blocks.

BACKGROUND

Water, wastewater, and industrial filtration units typically have an underdrain system for supporting filter media and spacing the filter media apart from the bottom of the filter. The underdrain system provides support for the filter media, collects the filtered water that passes through the media and uniformly distributes backwash water, backwash air, or a combination of both, across the filter.

Formations of support blocks are often used to construct the underdrain system. The support blocks may be made of pre-cast concrete blocks or concrete filled plastic jacketed blocks. The high-strength concrete blocks are placed side-by-side and end-to-end in the bottom of the filter to form a "false bottom." The blocks provide support for the filter media and are shaped to collect the filtered water that passes through the media.

In operation, a media filter will periodically require cleaning by backwashing the filter. In addition to shaping for collection, the blocks have conduits, commonly known as laterals, to allow for the passage of air or water used as a backwash. Problems can occur during backwash because the upward pressure of the air and/or water against the blocks is too forceful. Sometimes the pressure can fall within a range of 2 psi to 6 psi. Such strong pressure tends to dislocate the blocks, a process known as uplift. When uplift occurs, filter media drops onto the pipes and damages the infrastructure. Repairing such damage is costly. In addition, the costs of emptying the filter and realigning the blocks are also expensive. The process is labor intensive and requires substantial downtime of the filter. As a consequence, there is a need for a support system that resists uplift as well as side movements.

Existing systems for filter media support rely on the weight of the blocks to prevent block movement, use grout to fill the gaps between the blocks or use side rails to align the blocks side-to-side in the filter basin. Other systems use a series of modular, interconnected air duct blocks such that the interiors of separate air duct blocks are in fluid communication with one another to supply backwash gas through a single source of gas supply. These underdrain block designs offer only a limited amount of backwash stability and some are difficult to assemble. Because stability in the support system is important to avoid damage to the infrastructure, there is a need for an improved underdrain system that is easily assembled and will limit the movement of the underdrain blocks during backwash procedures in both the vertical and horizontal directions.

Definitions

For the purposes of this invention, a guide is defined as a device for steadying or directing the motion of a slide.

For the purposes of this invention, a slide is defined as an extension that is steered by one or more parts within which it slides.

For the purpose of this invention, a nub is defined as a protuberance projecting from a surface.

SUMMARY

The present invention provides stability for filter systems, such as waste water filter systems. The support blocks of the system withstand the horizontal and vertical movements caused by uplift forces during backwash procedures. To resolve the movement problems caused by uplift pressures, the present invention provides a multiple locking system that provides resistance to both horizontal and vertical movement of the blocks, thereby avoiding time consuming and costly shut down of the filters when the underdrain blocks are disturbed. Advantageously, one locking system comprises interlocking slides and guides that form a first locking joint. A second locking mechanism comprises nubs positioned on the side walls of the support blocks that form a second locking joint when inserted into recesses of a neighboring support block. The locking joint formed by the nubs positioned within the recesses is strengthened by the interlocking of the slides and guides.

The support system is easily assembled because, in one embodiment, the support blocks can be interlocked by vertical assembly. The slide of one block moves downwardly into the guide of another. In this manner, there is no need for any horizontal space in which to lay out and slide the support block. This is a benefit when a filter support system needs to be quickly assembled in a tight space, for example when attempting to get the filter back on line.

In one embodiment, the support system of the present invention comprises two or more interlocking rows of support blocks. Each support block comprises a shell. The shell has at least two side walls, a first end wall, a second end wall, a top wall, and a bottom wall. At least one side wall comprises one or more slides protruding from the side wall. At least one side wall comprises one or more guides protruding from the side wall. Each guide is conformed to receive one slide from an adjacent or a neighboring support block, so that as the blocks are aligned in rows, the slides on one row of blocks are inserted into the guides of an adjacent row of blocks. The guides and slides can be positioned on the same side of a block or on opposite sides of the underdrain block, i.e., the guides on a first side of a block and the slides on a second, opposite side of the block.

Advantageously, each guide comprises a first projection and a second projection distal from the first projection and the slide is sized and shaped to removably fit within an opening defined between the first projection and the second projection. The fit of the slide within the opening created by the projections is preferably a snug fit to avoid shifting of the blocks. At least one side wall defines one or more recesses. At least one side wall further comprises one or more nubs. Each nub is conformed to fit within one recess of an adjacent support block. Each recess has a size and shape that is conformed to receive a nub from an adjacent support block. As the slides are slipped into the guides, each nub fits within a recess.

In another embodiment of the support block, the support block comprises a housing. The housing defines a cavity which can be filled with weighting material. The housing comprises at least two side walls, a first end wall, a second end wall, a top wall, and a bottom wall. At least one side wall comprises one or more slides protruding from the side wall. At least one recess is defined on the side wall; the recess is located beneath a slide. At least one side wall comprises one or more guides, comprising a first projection and a second projection, jutting from the side wall. Advantageously, one or more nubs are positioned beneath the guides. The nubs comprise a flexible material and are shaped and sized to be flexed into place within a corresponding recess of an adjacent support block when a force is applied to the support blocks.

In another embodiment of this invention, each slide further comprises an end surface. The end surface further defines a recess. The side wall comprising the guides further comprises one or more nubs where each nub is positioned within one guide. The nubs are conformed to fit within a recess of an adjacent support block. The support block further comprises another locking joint wherein the first end wall comprises two tabs, a first tab and a second tab horizontally aligned to each other and the second end wall comprises a third tab that is designed to snugly fit between the first tab and second tab of an adjacent support block.

In an alternative embodiment of the support block, one or more nubs are positioned below the slides on the side walls. At least one side wall defines one or more recesses wherein the recesses are located between the first projection and second projection of the guides. The nubs are conformed to snugly fit within one recess of a neighboring support block when a force is applied to the support blocks.

In another alternative embodiment, at least one side wall comprises one or more slides protruding from the side wall. Each slide comprises at least fives sides, a top, a base, two sides connecting the top and the base, and a trapezoid-shaped front distal to the side wall. At least one of the side walls of the support block comprises one or more guides protruding from the side wall. Each guide comprises two projections, a first projection and a second projection distal to the first projection and a bottom lip. The two projections and the bottom lip of the guide define an opening. The two projections, the bottom lip and the slide all comprise flexible material. The slide further comprises a shape and size that conforms to the opening of the guide so that the slide flexes into the opening between the two projections when responding to a force exerted against the support block. At least one of the side walls defines one or more recesses. At least one side wall further comprises one or more nubs, the nubs are conformed to fit within a recess of an adjacent support block.

In another aspect of this invention, the two projections and the bottom lip of the guide define a trapezoid-shaped opening. The trapezoid-shaped front of the slide is constructed to securely fit within the trapezoid-shaped opening between the two projections when responding to a force exerted against the support block. The trapezoid-shaped front of the slide is designed to vertically align within the trapezoid-shaped opening of the guide. The side wall comprising the slides further defines at least one recess positioned beneath the slide. The guide further comprises one or more nubs positioned beneath the bottom lip of the guide.

In one embodiment of the method of this invention, the method of assembling the support system comprises aligning a slide of a first support block with a guide of a second support block. The slide of the first support block is vertically moved into the guide of the second support block.

In another embodiment of the invention, the method of interlocking two or more support blocks for a filter system comprises aligning a first support block having one or more slides adjacent to and slightly below a second support block having one or more guides. Each slide comprises a top, a base, two sides connected to the top and the base and trapezoid-shaped front distal to the side wall. Each guide comprises a bottom lip and two projections where the bottom lip and two projections of the guide define a trapezoid-shaped opening. The first support block is raised such that the trapezoid-shaped front of each slide of the first support block is aligned within each trapezoid-shaped opening of the guide of the second support block. Each support block further defines at least one recess positioned beneath the slide. Each guide further comprises one or more nubs positioned beneath the bottom lip of the guide. A force is exerted against the first support block until the recesses of the first support block receive the nubs of the second support block as the slides move into the trapezoid-shaped openings of the guide.

DETAILED DESCRIPTION

Figure 1:
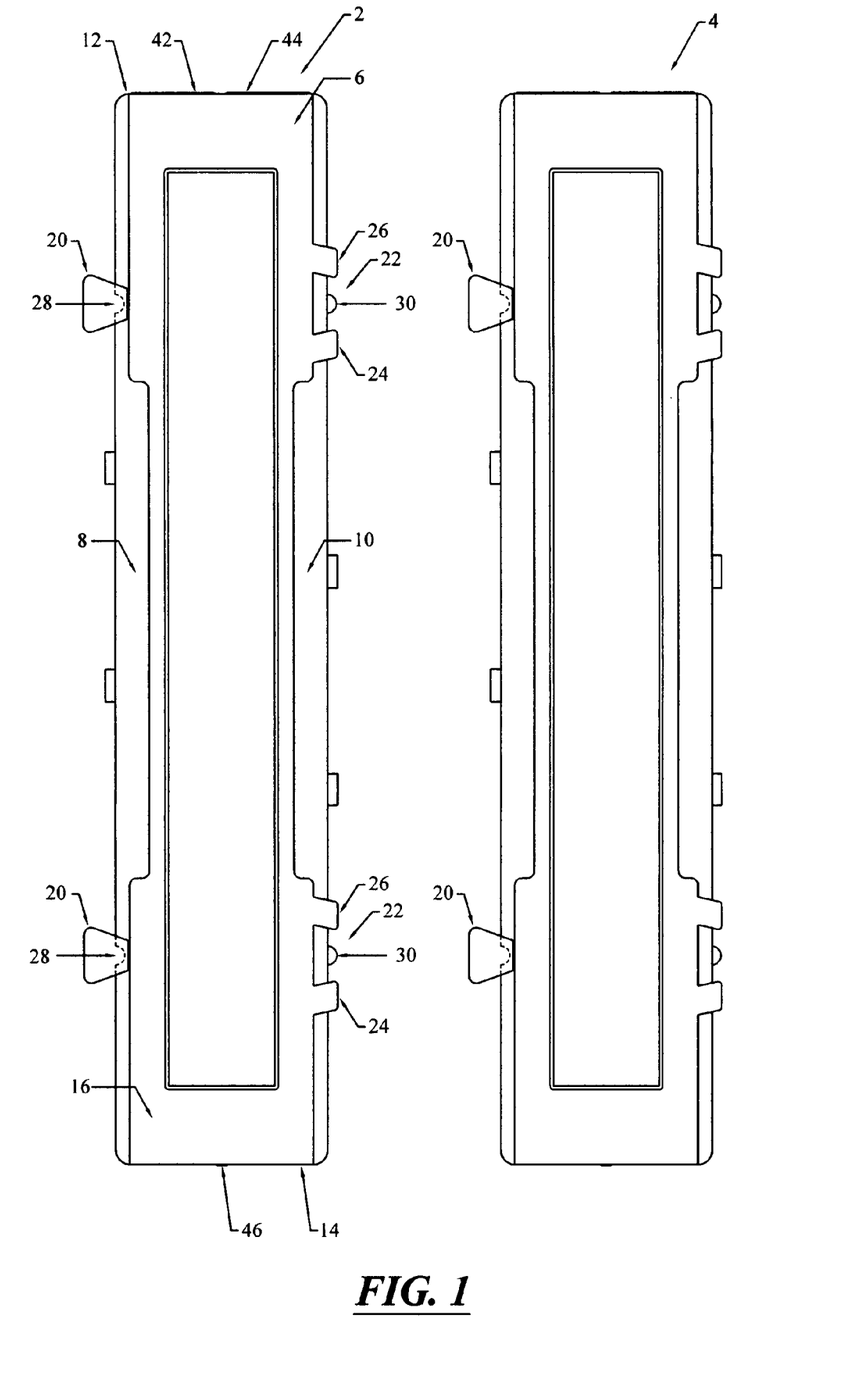
FIG. 1 is a top view of one embodiment of the support system illustrating two support blocks.

Referring now to FIG. 1, a top view of one embodiment of a support system for a filter is shown. The support system is used to provide a false bottom for wastewater filter. The false bottom provides a space for the filter infrastructure, backwash piping laterals, and sumps. The false bottom also protects the infrastructure from media filtering down towards the bottom. The support system can be used in a wastewater filter system. Movement of the support blocks, either vertical or horizontal can damage the infrastructure as well as allow media to drift to the bottom of the filter thereby clogging piping and sumps. Realignment of the blocks is costly and time consuming because the filter must be shut down and drained.

Figure 2:
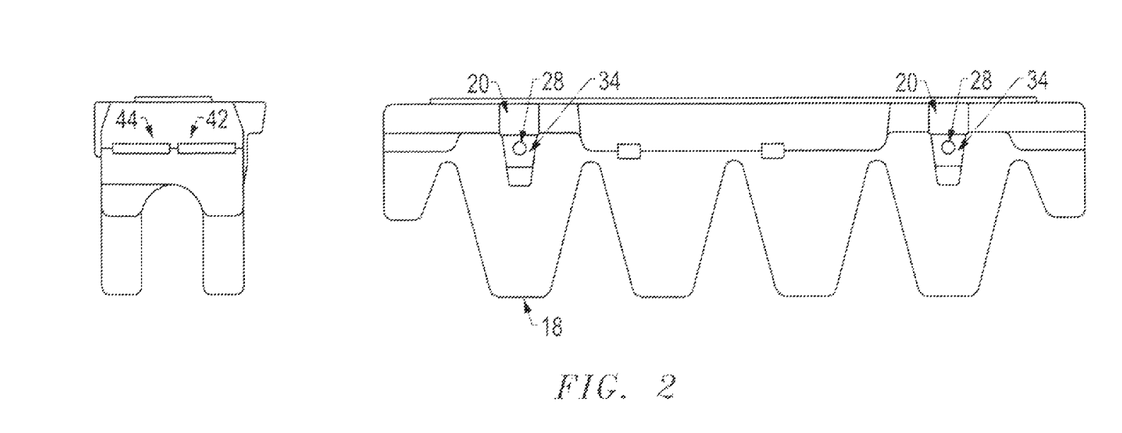
FIG. 2 is a side view of the first side wall of a support block showing the ends of the slides and the recesses.

To avoid shifting and movement of the underdrain or support blocks, the support system of the present invention comprises two or more interlocking rows of support blocks 2, 4. Multiple rows of support blocks are used to form the false bottom of the filter. A row is formed by support blocks placed end to end. Each support block 2 comprises a shell 6. The shell 6 comprises at least two side walls, a first side wall 8 and a second side wall 10, a first end wall 12, a second end wall 14, a top wall 16, and a bottom wall 18 (FIG. 2). In one embodiment, the shell comprises plastic material. The shell forms a cavity which may be filled with material to increase the weight of the block. The weight of the blocks helps resist uplift forces. Examples of suitable fill materials include gravel, cement, and sand.

Advantageously, the interlocking support system, having blocks locked in adjacent rows, uses the combined weight of the connected blocks to resist the uplift forces. The present invention comprises a multiple locking system that resists both horizontal as well as vertical movement of the blocks. In one embodiment, the interlocking mechanism comprises one or more slides 20 located on at least one side wall 8, 10. At least one side wall 8, 10 further comprises one or more guides 22 protruding from the side wall 8, 10. Each guide 22 is conformed to receive one slide 20 from a neighboring support block. Each guide 22 comprises a first projection 24 and a second projection 26 distal from the first projection 24. The first projection 24 is in horizontal alignment with the second projection 26. In another embodiment of the guide 22, the first projection 24 and the second projection 26 further define an opening. The slide 20 comprises a shape and size conformed to removably fit within the opening between the first and second projections 24, 26. In one aspect, the fit can be a close fit to avoid movement of the block by improving the locking mechanism.

Figure 6:
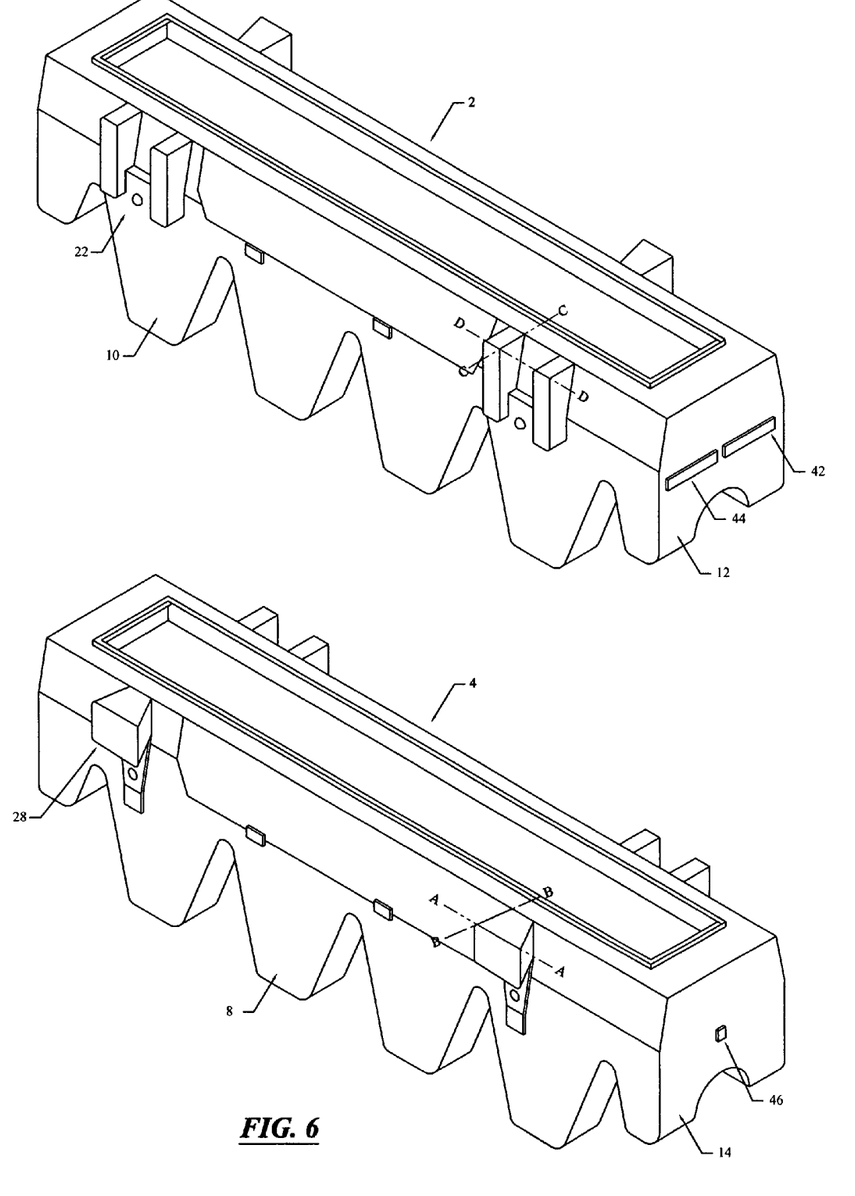
FIG. 6 is a three dimensional end view of both the end walls of the support block.

Referring to FIG. 6, when the support blocks 2, 4 are interlocked, the projections 24, 26 and the slides 20 extending out from the side walls 8, 10 define a space between the support blocks 2, 4. The space is necessary allowance for backwash water and air to travel upwards towards the filter media. Advantageously, in one embodiment of this invention, the depth of guide 22 as measured along the top of a projection extending from the side wall along axis C, C' comprises a range of from about 2.5 cm to about 3.5 cm. The width of the opening as measured at the widest point between the projections along axis D, D' comprises a range of from about 3.0 cm to about 4.0 cm. The depth of the slide 20 measured along the top of the slide to the side wall along axis B, B' comprises a range of from about 3.0 cm to about 5.0 cm. Referring back to FIG. 4, this space 57 or gap created between the blocks by the first locking joint is within a range of from about 5 mm to about 7 mm. The width of the slide at its widest point measured along axis A, A' comprises a range of from about 3.0 cm to about 4.0 cm. Because the dimensions of the slide 20 match the dimensions of the opening of the guide 22, when a slide 20 is tightly fitted within the guide 22, a strong joint is created that maintains the space between the support blocks as well as resists horizontal and vertical movement.

In one embodiment of this invention, the interlocking blocks are aligned side-by-side so that the guides 22 of the block in a first row face the slides 20 in a second row. As the blocks are placed on the floor of the filter, the guides 22 and slides 20 are aligned and the slide 20 moves into the opening between the first and second projections 24, 26 of the guide 22, forming a first locking joint to interlock the blocks. The placement of the blocks continues until the false bottom is completed and each row interlocks with an adjacent row. The interlocking of one row of blocks with another row helps the support system resist uplift and shifting caused by the backwash procedure. To further secure the interlock of the blocks, a second locking mechanism is created by a nub and recess locking joint. In this embodiment, at least one side wall 8, 10 defines one or more recesses 28. At least one side wall 8, 10 further comprises one or more nubs 30. Each nub 30 is conformed to fit securely within one recess 33 of a neighboring support block 4 to form the second locking joint. Each nub 30 is in positional agreement with a recess 33 of an adjacent support block.

The guides, slides, nubs and recesses 22, 31, 30, 33 forming the two interlock mechanisms may be either molded into the side walls 8, 10 of the blocks or attached as separate pieces. The guides 22 can be positioned on one side 8 of a block and the slides 20 positioned on a second opposite side 10 of the block. Alternatively, guides 22 and slides 20 can be positioned on the same side of the block. In either case, the guides 22 and slides 20 can be integral with and molded with the side walls 8, 10. The molded interlock mechanisms are formed as features of the plastic blocks when they are manufactured. The molded features are formed from the side walls themselves rather than being separate pieces added to the side walls. Alternatively, when parts 22, 31, 30, 33 are formed from separate pieces, they are attached by any suitable attachment means, such as an adhesive or screw attachment. The nubs 22, 31 can also be detached from the side wall 8, 10.

In one embodiment, the support blocks 2 comprise at least two guides 22, at least two slides 20, at least two nubs 30, and at least two recesses 33. The guides 22, slides 20, nubs 30, and recesses 33 can be positioned adjacent to the end walls 12, 14 of the support blocks, rather than close to the mid point of the support block. Positioning these interlocking parts adjacent to the end walls helps to decrease movement of the support blocks.

Figure 3:
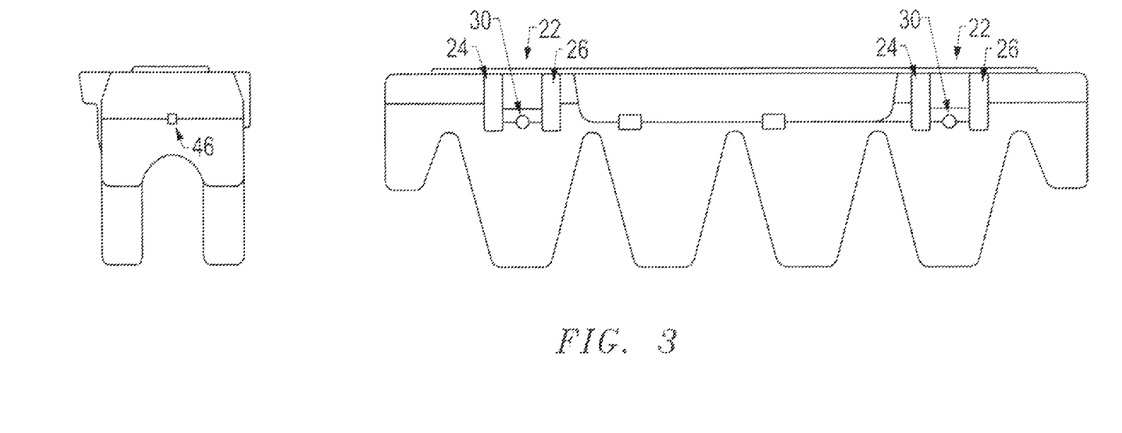
FIG. 3 is a side view of the second side wall of the support block showing the guides and the nubs.

Referring to FIGS. 2 and 3, detailed side views of one embodiment of the support block 2 are illustrated, where each slide 20 further comprises an end surface 34. Each end surface 34 of a slide defines one recess 28. In this embodiment, the nub 30 is conformed to fit within one recess 28. When the slides of one row of blocks locks into the guides of a second row of blocks, the nub 30 within each guide 22 interlocks with a recess 33 on the end surface of each slide 20 to further secure the block and form a locking system. In this arrangement, the guide 22 and slide 20 work to align the nub 30 and recess 33.

The guide 22, slide 20, nub 30, and recess 33 work together to flex-lock the blocks together. When the slide 20 is inserted into the guide 22, the nub 30 contacts the recess 33. Due to the elastomeric nature of the support block, as force is applied to continue the movement of the slide, the support block flexes to allow the motion to continue. The flexing occurs in the side walls 8, 10, the guide 22, the slide 20, or any combination of the three. When the nub 30 and recess 33 align, the flexing stops and the nub 30 is forced into the recess 33, flex-locking the nub 30 into the recess 33.

Reversing the flex-locking of the nub 30 into the recess 33 to unlock the blocks is more difficult than engaging the nub 30 and recess 33 because the nub 30 is held in the recess 33 by the engagement of guide 22 and slide 20. While in the recess 33, the nub 30 cannot cause the flexing necessary to remove the nub 30 from the recess 33. The engagement of the nub 30 into the recess 33 resists the vertical forces associated with uplift. When the nub 30 is in the recess 33, the overlapping areas of the nub 30 and recess 33 prevent the independent upward movement of one block alone. When one block attempts to lift upward, its nubs and recesses are restrained by the nubs and recesses of the adjacent blocks.

Referring now to FIG. 3, in one embodiment, the first projection 24 of the guide is aligned along a horizontal axis to the second projection 26 of the guide. This allows the slide 20 to engage the guide 22 by moving vertically into the guide 22. Moving and aligning the support blocks may be done either manually or with assistance of a lifting machine, such as a crane or backhoe. Vertical engagement of guide 22 and slide 20 allow the support system to be assembled with greater ease than horizontal engagement. Vertical engagement requires less working area then horizontal engagement because the guide 22 and slide 20 are aligned directly above one another rather than offsetting the blocks and sliding the entire block. Additionally, in vertical engagement, gravity will assist in providing the downward force necessary to flex-lock the nub 30 into the recess 33.

Figure 4:
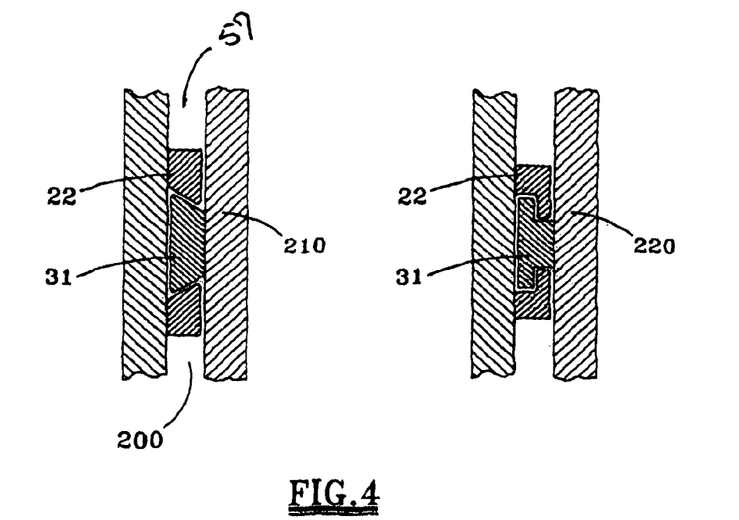
FIG. 4 is a top view of both a fan shaped slide form and T-shaped slide interlocked with complementary guides.

Referring now to FIG. 4, in one embodiment of the support system, each guide 22 forms a locking joint 200 with one slide 20 of a neighboring support block. The locking joint 200 resists horizontal movement of the support blocks. Forming the locking joint 200 causes the nub 30 of one block to protrude into one recess of a neighboring block 33 thus forming a second locking joint. In one embodiment, the slide can be fan-shaped 210. In an alternate embodiment, the slide is T-shaped 220. The fan-shaped slides 210 and the T-shaped 220 slides, along with their complementary guides 22, form a locking joint 200 that resists the forces horizontally pulling the neighboring blocks apart. The shape of the guides 22 allows the slides 20 to easily move into the guides 22 in a direction tangential to the side walls of the blocks, however, when the slides 20 and guides 22 are T-shaped or fan-shaped, the guide 22 will pull against the slide 20 to prevent the blocks from pulling apart.

Figure 5:
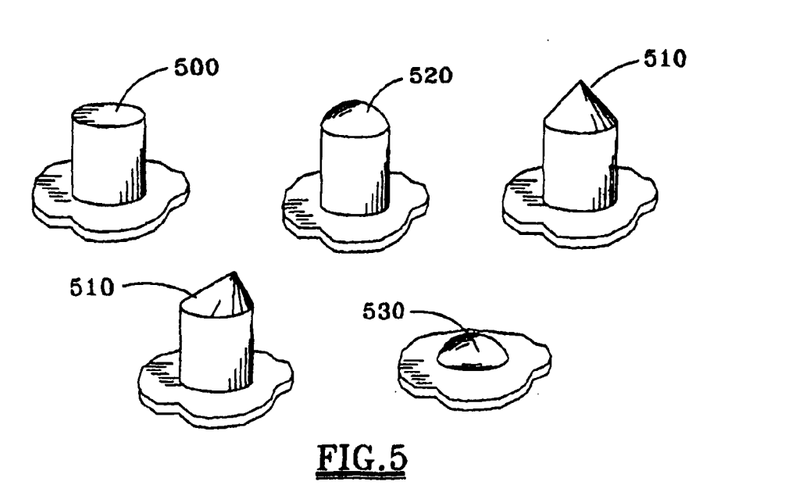
FIG. 5 is a side view of several embodiments of the nub.

Referring now to FIG. 5, in one embodiment of the support system, each nub is cylindrically-shaped 500 and each recess 33 is shaped to form a close fit with the nub 500. In a further embodiment, the cylindrically-shaped nub 500 has sloped end surface 510. In still another embodiment, the cylindrically-shaped nub 500 comprises a rounded end surface 520. Alternatively, the nub and recess may be substantially semi-spherically shaped 530. The sloped and rounded end surfaces 510, 520, 530 assist in the engagement of the nub and recess, by reducing the surface area in contact between the nub 30 and end surface 34 of the guide. This reduces friction forces resisting the movement of the nub 30.

Referring now to FIG. 6, in one embodiment of the support system, the first end wall 12 comprises a first tab 42 and a second tab 44. The first tab 42 is horizontally aligned to the second tab 44. The second end wall 14 comprises a third tab 46. The third tab 46 is positioned to fit between the first tab 42 and the second tab 44 of a neighboring support block. The engagement of tabs on the end walls of the support blocks also aids to resist the horizontal movement of the blocks.

Figure 7A:
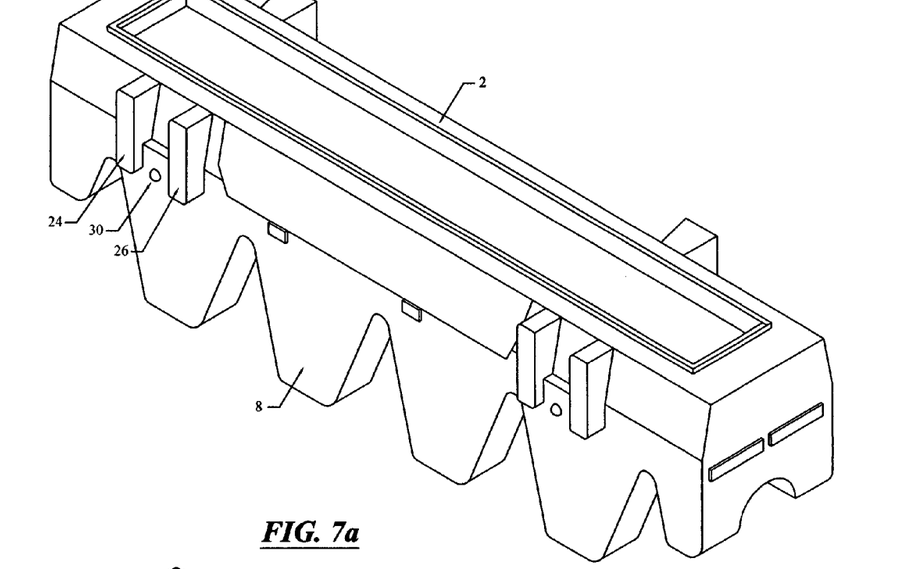
FIGS. 7*a* and 7*b* are side views of another embodiment of a support block.
Figure 7B:
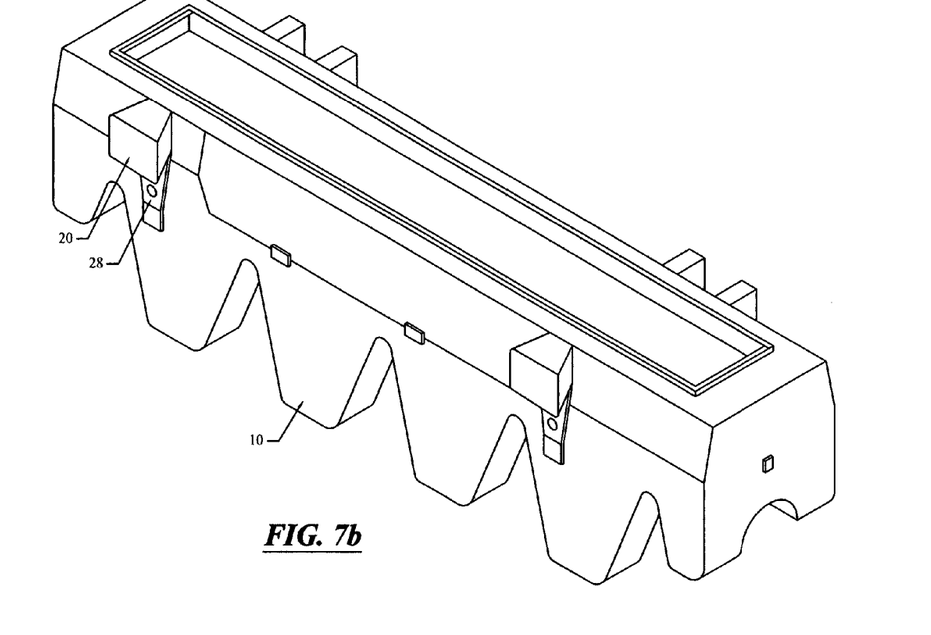

Referring now to FIGS. 7a and 7b, another embodiment of the support block 2 for a filter system comprises a housing. The housing comprises a plastic jacket and concrete mold. The plastic jacket of the housing defines a cavity which may be filled with material to increase the weight of the block. The weight of the blocks helps resist uplift forces. Examples of suitable fill materials include gravel, cement, and sand.

At least one side wall 10 comprises one or more slides 20. The side wall 10 comprising the slide 20 further comprises one or more nubs 30. Each nub 30 is positioned beneath the slide 20. At least one side wall 8 comprises one or more guides 22 comprising a first projection 24 and a second projection 26 distal to the first projection 24. One or more recesses 28 are defined between the first projection 24 and the second projection 26. The nub 30 is conformed to fit within the recess 28.

Figure 8:
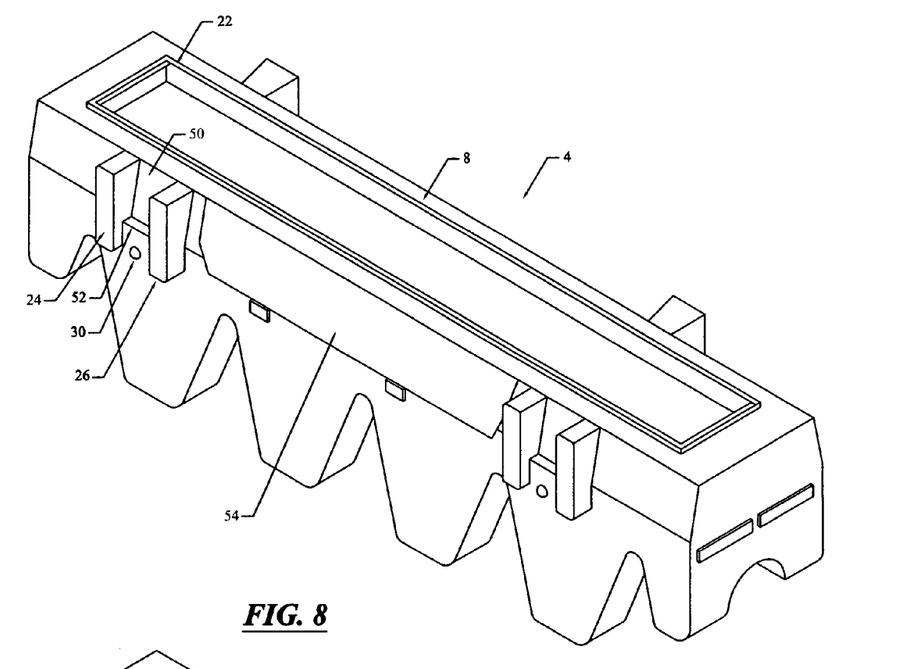
FIG. 8 depicts an embodiment of a guide of the support block.
Figure 9:
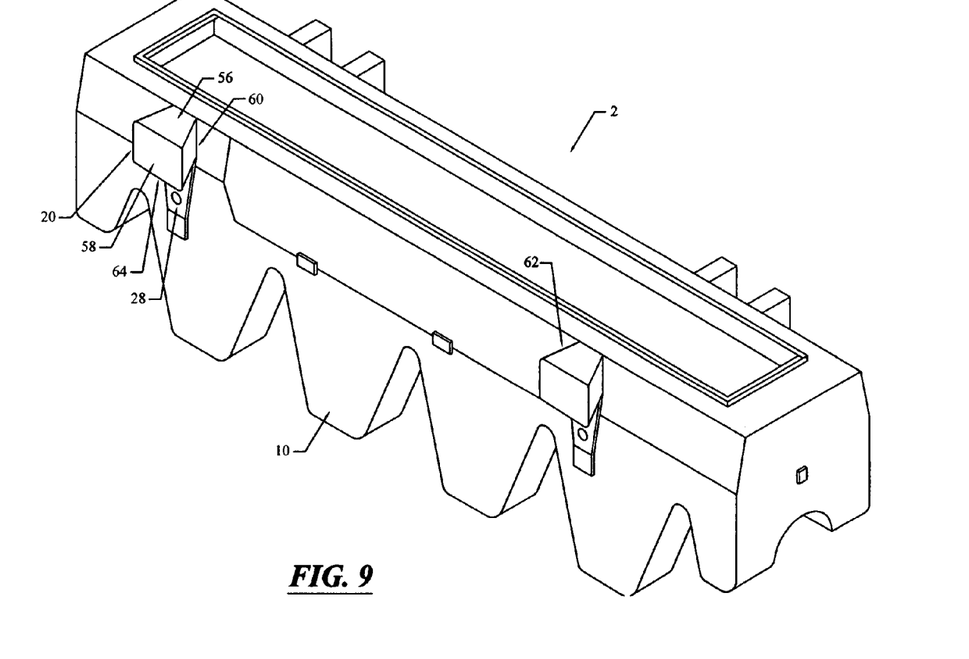
FIG. 9 depicts an embodiment of a slide of the support block.

Referring now to FIGS. 8 and 9, other embodiments of a support block 2 for a filter system are shown. Each guide 22 comprises a first projection 24, a second projection 26 distal from the first projection 24 and a bottom lip 52 connecting the first projection 24 and second projection 26. The two projections 24, 26 and the bottom lip 52 together define an opening 50. One or more slides 20 are horizontally aligned on the support block 2. Each slide 20 comprises a top 56, a base 64, two sloped sides 60, 62 connecting the top 56 and the base 64, and a trapezoid-shaped front 58 distal to the side wall. The top 56 further comprises a horizontal ledge. The two sloped sides 60, 62 incline downwards from the horizontal ledge. The sloped sides 60, 62 of the slide 20 ease the positioning of the slide 20 within the guide 22.

Referring to both FIG. 8 and FIG. 9, the slide 20, two side projections 24, 26 and the bottom lip 52 each comprise flexible material. The flexible material comprises plastic material. A force exerted against the support block 2 results in the slide 20 being flexibly inserted within the opening 50 between the two side projections 24, 26 and the bottom lip 52. The slide 20 fits securely within the opening 52, with the base 64 of the slide situated above the bottom lip 52 of the guide 22. In one embodiment, the slide 20 is filled with suitable fillers such as cement, gravel and sand but still retains its flexibility to be maneuvered upon application of a small force to fit under the bottom lip 52 of the guide 22.

In another embodiment, the first side projection 24, second side projection 26 and the bottom lip 52 together define a trapezoid-shaped opening 50 in the guide 22. At least one nub 30 is positioned adjacent to the guide 22. In one embodiment, the nub 30 is positioned beneath the trapezoid-shaped opening 50. In another embodiment, the nub 30 is positioned within the guide 22 and is equidistantly positioned between the two projections. The nub 30 is detachable. Each slide 20 of a first support block 2 of the invention is designed to fit within a corresponding trapezoid-shaped opening 50 of the guide of an adjacent support block, such that the two support blocks are interlocked when the slide 20 is vertically positioned within the trapezoid-shaped opening 50. At least one recess 28 is defined adjacent to the slide 20. In one embodiment, the recess 28 is positioned beneath the slide 20. The nub 30 and recess 28 are substantially semi-spherical in shape. The nub 30 and recess 28 have substantially corresponding shapes and sizes so that the nub 30 of one support block fits closely within the recess 28 of an adjacent support block when the two blocks are joined.

The location of the slides 20 on the support block 2 can be limited to one side wall 10 or included on both side walls 8, 10. The same is true for the guides 22, a first side wall 8 can have only guides 22 or both guides 22 and slides 20 alternatively positioned on the side wall 8. The second side wall 10 can comprise only slides 20 or both slides 20 and guides 22. At least one side wall 8, 10 comprises one or more spacers 54.

Referring back to FIG. 1, assembling the filter media support system of the present invention is often performed on-site. In one embodiment of the method of interlocking support blocks for a filter system, the method comprises vertically aligning a slide 20 of a first support block above a guide 22 of a second support block. The slide 20 of the first support block is moved vertically down into the guide 22 of the second support block, which is easier than having to horizontally connect the blocks. While moving and aligning the support blocks may be performed in any reasonable manner, often the support blocks will be moved manually. A crane, backhoe, or other lifting device may also be employed to assist in moving the blocks.

While the force of gravity may be enough to engage the blocks, the method may further comprise applying a downward force to the first support block until a nub 30 on the second support block flexibly locks into a recess 33 on the first support block. In an additional embodiment, the method comprises fitting one tab 46 located on an end wall of the first support block may be between two tabs 42, 44 on an end wall of an adjacent support block. To assemble the entire support system which forms the false bottom of the filter, the methods of this invention may be repeated as many times as necessary.

Another embodiment of the invention teaches a method for interlocking two or more support blocks 2, 4, as illustrated in FIGS. 8 and 9, for a waste water filter system. The support blocks 2, 4 used in this method are as described above. The method comprises aligning the slides 20 of the first support block 2 adjacent to and positioned slightly below the second support block 4. The first support block 2 is raised so that the slides 20 are aligned within the trapezoid-shaped openings 50 of the second support block 4. Force is applied to the first support block 2 until the base 64 of the slides are positioned above the bottom lip 52 of the guide as the slide 20 moves into the trapezoid-shaped opening 50. The slides 20 and the guides 22 comprise flexible materials. Due to the elastomeric nature of the slides 20 and guides 22, as force is applied against the first support block 10, the slides 20 and guides 22 flex to allow the motion to continue so that the slide 20 slips snugly into the guide 22. When the slides 20 and guides 22 align, the flexing stops and the slide 20 is positioned within the guide 22 thereby interlocking the support blocks 2, 4.

While the system an method of the invention has been shown and described with reference to several embodiments, it will be understood by those skilled in the art that various changes in form and detail may be made therein without departing from the spirit and scope of the invention. The described embodiments are presented for the purposes of illustration and not limitation; the present invention is limited only by the claims that follow.

The invention claimed is:

1. A support system for a filter system, the support system comprising:
    two or more interlocking rows of support blocks;
    each support block comprising:
        a shell, the shell comprising a first side wall, a second side wall, a first end wall, a second end wall, a top wall, and a bottom wall;
        one or more slides, each slide extending from a surface of the first side wall or a surface of the second side wall;
        one or more guides, each guide conformed to receive a corresponding slide from an adjacent support block, each guide comprising a first projection and a second projection that extend from the surface of the first side wall or the surface of the second side wall, the second projection being in alignment with the first projection and distal from the first projection;
        one or more recesses, each recess being formed in the surface of the first side wall or the surface of the second side wall; and
        one or more nubs, each nub extending from the surface of the first side wall or the surface of the second side wall, each nub conformed to fit within a corresponding recess of an adjacent support block.

2. The support system of claim 1 wherein at least one of the slides comprises a shape that is fan-shaped, T-shaped, square-shaped or rectangular-shaped.

3. The support system of claim 1 wherein at least one of the slides comprises at least five sides, the five sides further comprising a top, a base, two sides connecting the top to the base, and a front, the top and the base having a trapezoidal shape.

4. The support system of claim 1 wherein the first projection and the second projection of each guide define an opening and the corresponding slide of the adjacent support block comprises a size and shape conformed to removably fit within the opening to form a first interlocking joint.

5. The support system of claim 4 wherein at least one of the nubs is positioned beneath the opening of an associated guide.

6. The support system of claim 4 wherein at least one of the nubs is positioned within the opening of an associated guide.

7. The support system of claim 1 wherein an end surface is formed beneath a corresponding slide, the end surface defining one of the recesses, one of the nubs of an adjacent block interlocking with the recess to form a second interlocking joint.

8. The support system of claim 1 wherein each guide further comprises a bottom lip connecting the first projection and the second projection.

9. The support system of claim 1 further comprising at least two joints, the first joint comprising the one or more guides positioned on the support block and the one or more slides positioned on an adjacent support block, each slide fitted between the first and second projections of a corresponding guide, the second joint comprising the one or more nubs positioned on the support block and the one or more recesses positioned on the adjacent support block, each of the nubs being closely fitted within a corresponding recess so that the first joint and the second joint together resist horizontal and vertical movement of the support blocks.

10. The support system of claim 1 wherein at least one of the recesses is formed in a portion of the surface of the first side wall or a portion of the surface of the second side wall between the first projection and the second projection of an associated guide.

11. The support system of claim 10 wherein each of the one or more nubs is positioned beneath an associated slide, so that each of the one or more nubs closely fits within a corresponding recess of the adjacent support block when the blocks are joined so as to resist movement of the support blocks.

12. The support system of claim 1 wherein at least one of the nubs is cylindrically-shaped and for each cylindrically-shaped nub, a corresponding recess is shaped to form a close fit with the cylindrically-shaped nub when the cylindrically-shaped nub is secured within the corresponding recess.

13. The support system of claim 12 wherein each cylindrically-shaped nub comprises a sloped end surface or a rounded end surface.

14. The support system of claim 1 wherein at least one of the nubs is substantially semi-spherically shaped and at least one of the recesses is substantially semi-spherically shaped.

15. The support system of claim 1 wherein a depth of each projection extending from the side wall comprises a range of from about 2.5 cm to about 3.5 cm.

16. The support system on claim 1 wherein the shell comprises plastic material.

17. The support system of claim 1 wherein the first end wall comprises a first tab and a second tab, the first tab horizontally aligned with the second tab; and the second end wall comprises a third tab positioned to fit between the first tab and the second tab of an adjacent support block.

18. The support system of claim 1 wherein at least one guide is integrally formed with at least one side wall and at least one slide is integrally formed with at least one side wall.

19. A method of interlocking support blocks to form the support system of claim 1, the method comprising:
    aligning a slide positioned on a side wall of a first support block with a corresponding guide positioned on a side wall of a second support block; and
    vertically moving the slide of the first support block into the corresponding guide of the second support block to form an interlocking joint.

20. The method recited in claim 19, wherein the method further comprises applying a downward force to the first support block until a nub on the second support block flex-locks into a corresponding recess on the first support block to form a second interlocking joint.

21. The method recited in claim 19, wherein the support system comprises a plurality of rows of support blocks and the method further comprises the step of interlocking one row of support blocks with an adjacent row of support blocks to resist vertical and horizontal movement.

22. The method recited in claim 21, wherein the method further comprises creating a space between the interlocking rows of support blocks, wherein the space is a width comprising a range of from about 3.0 cm to about 5.0 cm.

23. A method for interlocking two or more support blocks to create the support system of claim 1, the method comprising:
    (a) aligning a first support block having the one or more slides adjacent to and slightly below a second support block having the one or more guides, the slides positioned on a side wall of the first support block and the guides positioned on a side wall of the second support block, the slides each comprising a top face, a base, a front face, two sides connecting the top and the base, the top face and the base having a trapezoidal shape, the first support block further defining an associated recess positioned beneath each slide, each guide comprising two projections and a bottom lip, the two projections and the bottom lip of the guide defining a trapezoidal shaped opening, the second support block having the one or more guides further comprising one or more nubs, each nub being positioned beneath the bottom lip of an associated guide, each nub conformed to fit within a corresponding recess of the first support block;

(b) raising the first support block so that the one or more slides of the first support block are aligned within the one or more trapezoid-shaped openings of the one or more guides of the second support block to form a first interlocking joint; and (c) exerting a force against the first support block until the nubs of the second support block are received by the recesses of the first support block as the one or more slides move into the one or more trapezoid-shaped openings of the one or more guides of the second support block to form a second interlocking joint.

24. The method of claim 23 wherein the one or more slides and the one or more guides comprise flexible material and the step of exerting a force against the first support block flexes the one or more slides and the one or more guides so that each slide is in tight engagement with the corresponding guide when the force is exerted to position each slide within the opening of the corresponding guide so that the first support block and the second support block are interlocked.

25. The support system of claim 1, wherein the first projection is in alignment with the second projection along a first axis, a slide of the adjacent support block being received by the opening of a corresponding guide of the support block along a second axis perpendicular to the first axis, the second axis extending between the top wall and the bottom wall.

26. A support block for a filter system comprising:
a housing, the housing comprising a first side wall, a second side wall, a first end wall, a second end wall, a top wall, and a bottom wall;
one or more slides, each slide extending from a surface of the first side wall or a surface of the second side wall;
one or more guides, each guide comprising a first projection and a second projection that extend from the surface of the first side wall or the surface of the second side wall, the first projection and the second projection defining an opening therebetween, the opening conformed to receive a corresponding slide from an adjacent support block to form a first interlocking joint;
one or more recesses, each recess being formed in the surface of the first side wall or the surface of the second side wall and below an associated slide; and
one or more nubs, each nub extending from the surface of the first side wall or the surface of the second side wall and being positioned below an associated guide, each nub conformed to fit within a corresponding recess of the adjacent support block to form a second interlocking joint.

27. The support block of claim 26 wherein at least one of the nubs comprises a flexible material, the at least one nub further comprising a size and shape to flex-lock into a corresponding recess of an adjacent support block when a force is exerted on the support block.

28. A support block for a filter system comprising:
a housing, the housing comprising a first side wall, a second side wall, a first end wall, a second end wall, a top wall, and a bottom wall;
one or more slides, each slide extending from a surface of the first side wall or a surface of the second side wall;
one or more guides, each guide comprising a first projection and a second projection that extend from the surface of the first side wall or the surface of the second side wall, the second projection being in alignment with the first projection and distal from the first projection;
the first projection and the second projection defining an opening therebetween, the opening conformed to receive a corresponding slide from an adjacent support block to form a first interlocking joint;
one or more recesses, each recess being formed in a portion of the surface of the first side wall or a portion of the surface of the second side wall between the first projection and the second projection of an associated guide; and
one or more nubs, each nub extending from the surface of the first side wall or the surface of the second wall and being positioned below an associated slide, each nub conformed to fit within a corresponding recess of the adjacent support block.

29. A support block for a filter system, the support block comprising:
a housing, the housing comprising a top wall, a bottom wall, a first side wall and a second side wall, and a first end wall and a second end wall, the end walls and side walls connecting the top wall to the bottom wall;
one or more slides, each slide extending from the first side wall or the second side wall, each slide comprising a top, a base, two sides, and a trapezoid-shaped front distal to the side wall, each slide top comprises a horizontal ledge projecting from the surface of the first side wall or the surface of the second side wall, the two sides descending from the horizontal ledge to the surface of the first side wall or the surface of the second side wall;
one or more guides, each guide comprising:
a first projection and a second projection that extend from the surface of the first side wall or the surface of the second side wall,
and a bottom lip, the two projections and the bottom lip defining an opening, the two projections and the bottom lip comprising flexible material, each slide comprising flexible material, each slide further comprising a size and shape that conforms to the opening of a corresponding guide of an adjacent support block so as to flex into the opening of the corresponding guide when responding to a force exerted against the support block so as to form a first interlocking joint;
one or more recesses, each recess being positioned within or adjacent to an associated slide; and
one or more nubs, each nub being positioned within or adjacent to an associated guide, each nub sized and shaped to flexibly lock within a corresponding recess of the adjacent support block to form a second interlocking joint.

30. The support block of claim 29 wherein each of the one or more nubs is positioned beneath the bottom lip of the associated guide so that each nub is capable of being flex-locked within a corresponding recess of the adjacent support block.

31. The support block of claim 29 wherein the two projections and the bottom lip of each guide define a trapezoid-shaped opening, the trapezoid-shaped front of each slide of the support block being designed to fit securely within the trapezoid-shaped opening of a corresponding guide of an adjacent support block.

32. A support block for a filter system, the support block comprising:
   a shell, the shell comprising a top wall, a bottom wall, two end walls, and
   a first side wall and a second side wall, the end walls and the side walls connecting the top wall to the bottom wall;
   one or more slides, each slide extending from a surface of the first side wall or a surface of the second side wall, each slide comprising a top, a base, two sides and a trapezoid-shaped front distal to the first side wall or the second side wall;
   one or more guides, each guide comprising a first projection and a second projection that extend from the surface of the first side wall or the surface of the second side wall, and a bottom lip, the two projections and the bottom lip of each guide defining a trapezoid-shaped opening, the trapezoid-shaped front of a corresponding slide of an adjacent support block being designed to fit securely within the trapezoid-shaped opening of a corresponding guide of the support block when the slide is positioned within the trapezoid-shaped opening;
   one or more recesses formed in the surface of the first side wall of the surface of the second side wall, each recess being positioned beneath an associated slide; and
   one or more nubs, each nub being positioned beneath the bottom lip of an associated guide, each nub conformed to fit within a corresponding recess of the adjacent support block.

33. The support block of claim 32 wherein at least one of the first side wall and the second side wall further comprises one or more spacers.

34. A support system comprising:
   a plurality of interlocking support blocks, each support block comprising:
   a first side wall,
   a second side wall,
   a first end wall,
   a second end wall,
   a top wall, and
   a bottom wall;
   the first side wall and the second side wall each comprising a side surface, a portion of which is substantially perpendicular to the top wall;
   one or more slides, each slide extending from the side surface of the first side wall or the side surface of the second side wall;
   one or more guides, each guide comprising:
   a first projection, and
   a second projection,
   the first projection and the second projection each extending from the side surface of the first side wall or the side surface of the second side wall and together defining an opening for receiving a corresponding slide of an adjacent support block;
   one or more recesses, each recess being formed in the side surface of the first side wall or the side surface of the second side wall; and
   one or more nubs, each nub extending from the side surface of the first side wall or the side surface of the second side wall,
   wherein each nub is conformed to fit within a corresponding recess of an adjacent support block.

35. A support system comprising:
   a plurality of interlocking support blocks, each support block comprising:
   a top wall and a bottom wall;
   a first side wall and a second side wall, the first side wall and the second side wall each comprising a side surface, a portion of which is substantially perpendicular to the top wall;
   a first end wall and a second end wall;
   one or more slides, each slide extending from the side surface of the first side wall or the side surface of the second side wall;
   one or more guides, each guide comprising:
   a first projection,
   a second projection, and
   a lip,
   the first projection and the second projection each extending from the side surface of the first side wall or the side surface of the second side wall and defining an opening for receiving a corresponding slide of an adjacent support block;
   one or more recesses, each recess being formed in the side surface of the first side wall or the side surface of the second side wall; and
   one or more nubs, each nub extending from the side surface of the first side wall or the side surface of the second side wall, wherein:
   each nub is conformed to fit within a corresponding recess of an adjacent support block, and
   the opening of at least one guide is further defined by an upper surface of the lip, the upper surface of the lip extending from the side surface of the first side wall or the side surface of the second side wall a lesser distance than a distance that an upper surface of the first projection and an upper surface of the second projection extend from the side surface of the first side wall or the side surface of the second side wall.

\* \* \* \* \*